United States Patent Office 3,303,715
Patented Feb. 14, 1967

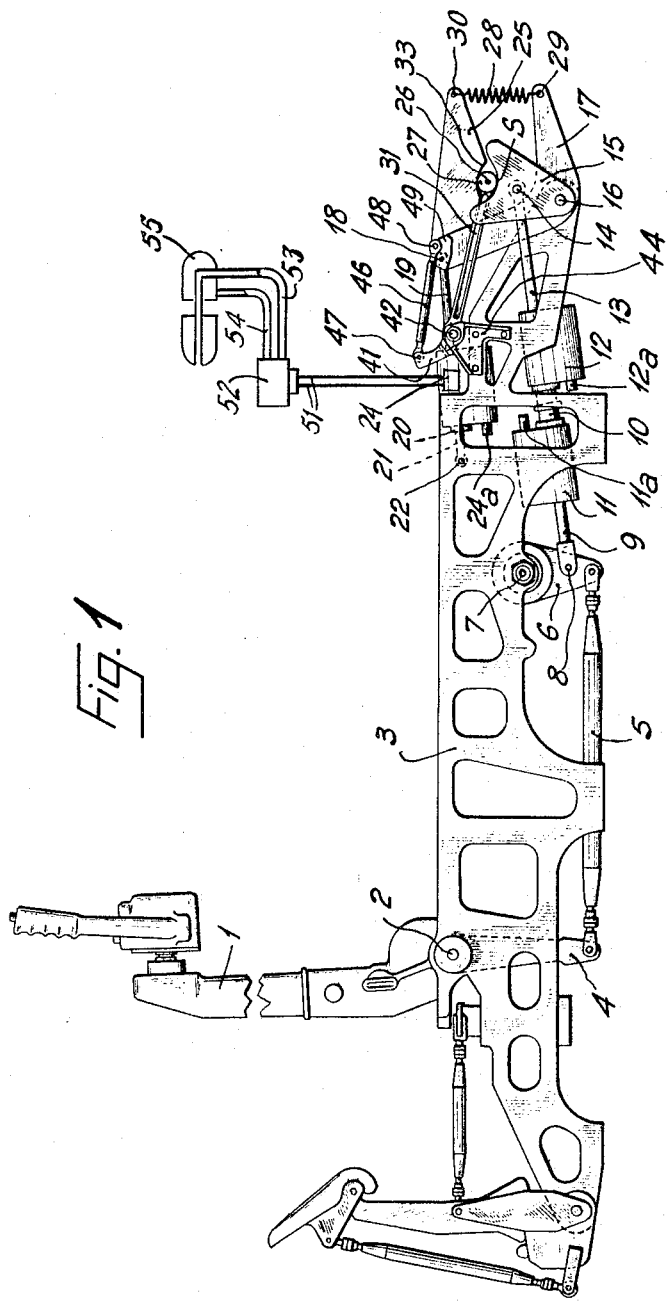

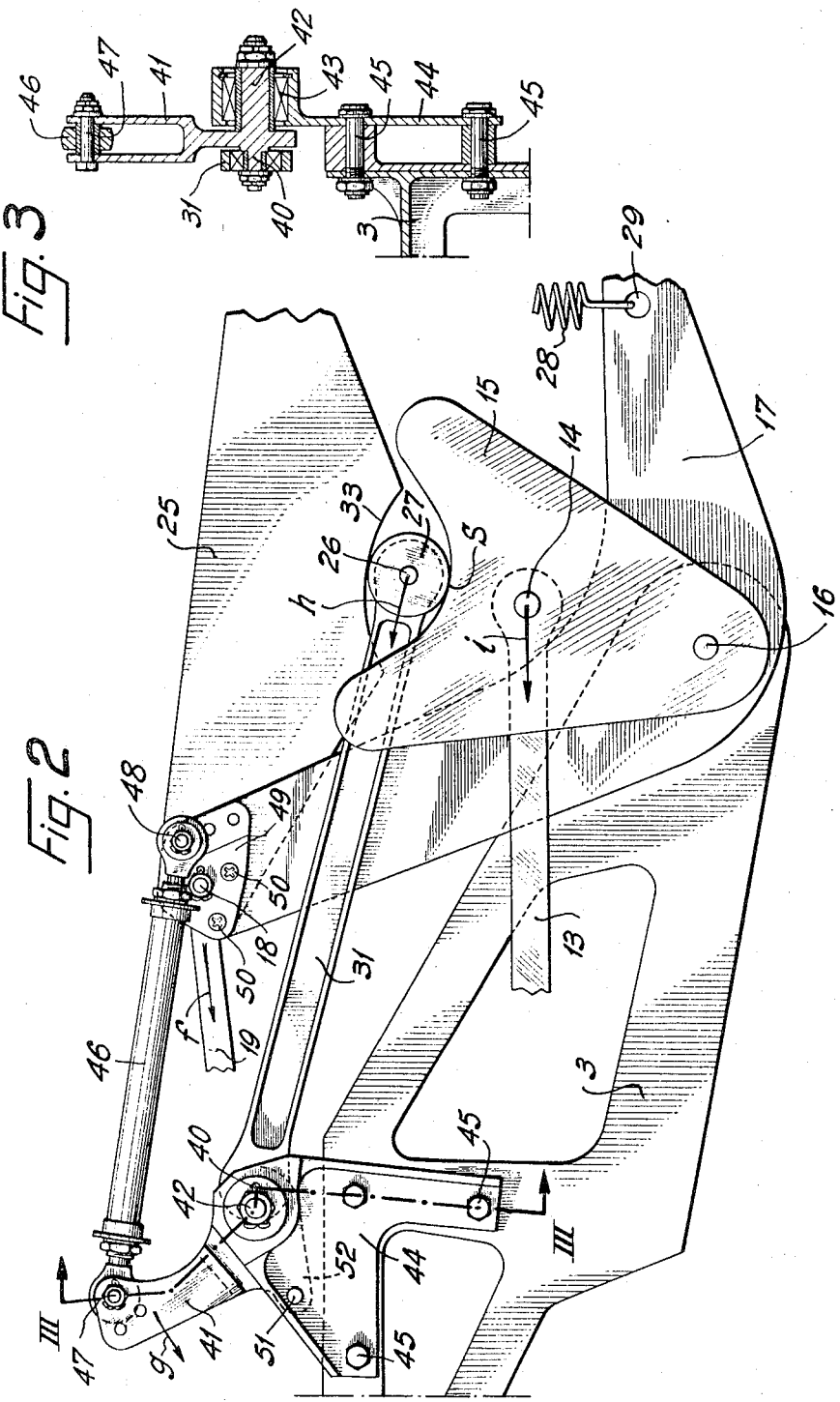

3,303,715
AIRCRAFT FEEL SIMULATOR
Joël Zimer, Paris, France, assignor to Societe Anonyme des Ateliers d'Aviation Louis Breguet, Paris, France, a company of France
Filed Apr. 6, 1965, Ser. No. 445,924
Claims priority, application France, June 12, 1964, 978,188
2 Claims. (Cl. 74—470)

In the U.S.A. patent application No. 420,391, filed on December 22, 1964, by J. C. Fontaine, an apparatus for the creation of artificial sensations was described which was intended for machines such as aircraft and which comprised essentially two levers connected by an elastic device and the spacing of which is made dependent on a cam on which acts the control member with which the apparatus for the creation of artificial sensations is associated.

According to one form of embodiment of the invention described in the aforesaid patent application, the cam is articulated to the pivot of one of the levers and it acts on the other lever through the interposition of a wheel or wheels, the shaft of which is connected by a link to a fixed point on the frame. The two levers are articulated to one another and their point of articulation can be displaced in dependence on the speed of the aircraft so as to introduce the speed factor into the operation of the apparatus for the creation of artificial sensations. Furthermore the control member, in this case the joystick, acts on the cam by means of a rod system equipped with a mechanism known as a "trim" mechanism, by means of which the pilot can bring the wheels to the low point of the cam so as to annul the reactions in the control member when the aircraft has reached the desired conditions of flight.

The present invention has as its object to provide an improvement in the apparatus for the creation of artificial sensations which has just been mentioned, in order to enable it to assume a new function which is the improvement of the longitudinal stability of the aircraft.

It is known that, in order that an aircraft should be stable, it should tend to return to its initial position of equilibrium when it is moved out of such a position.

Now, with the apparatus as described in the aforesaid U.S.A. patent application, when the pilot has brought the aircraft to the desired speed and then, by means of the trim mechanism, has regulated the apparatus for artificial sensations so as to have no further reaction in the control surfaces, if owing to a gust of wind or any other cause the speed happens to vary, the apparatus for the creation of artificial sensations does not warn him of this variation.

The present invention makes it possible to remedy this state of affairs by arranging the apparatus for artificial sensations in such a manner that it reacts on the control surfaces with which it is associated and, in the sense of stability, in the case of variation in the speed of the aircraft.

For this purpose, for example, instead of arranging that the wheels by which the cam acts on the corresponding lever of the apparatus are obliged to remain at a given distance from a fixed point, the said distance is made variable in dependence on the speed of the aircraft, for example by connecting the said fixed point to the rod which carries the wheels, by means of an eccentric the movement of which is dependent on the speed.

Thus, a variation in the speed of the aircraft will have the result of lengthening or shortening the said distance and of making the wheels mount on the cam in one direction or the other, which will subject the cam to a torque which will have repercussions on the control surfaces, the reactions of which will warn the pilot that the speed has changed. The pilot can thus correct the travel of the aircraft.

Furthermore, the setting of the eccentric is such that the mounting of the wheels on the cam which has just been mentioned is effected in the sense of safety, i.e. in such a sense that it acts on the control surfaces so as to bring about the movement which tends to correct the variation which has produced it. If the speed increases, the control surfaces are subjected to a reaction corresponding to a climb which diminishes the speed of the aircraft, and if the speed decreases the reaction on the control surface corresponds to a dive in order to increase the speed.

The invention is illustrated by way of example in the accompanying drawings, in which:

FIGURE 1 is an elevational view of an apparatus for the creation of artificial sensations improved in accordance with the present invention;

FIGURE 2 is a partial view on elevation, on a larger scale, of a portion of the apparatus, and FIGURE 3 is a sectional view on III—III of FIGURE 2.

In the form of embodiment illustrated in the drawings, the joystick 1, pivotably mounted at 2 on a frame 3, is fast with an arm 4 which, by way of a transmission element such as a link 5, acts on a lever 6 pivotably mounted on the frame 3 by a transverse pin 7.

Pivotably mounted on the lever 6 by a pin 8 is a bar 9 which a jack device 10, controlled by a motor 11 and a reserve motor 12, connects to another bar 13 pivotably connected at 14 to a cam 15; the motors make it possible to shorten or lengthen, optionally, the distance separating the points of articulation 8 and 14. The jack device 10 may comprise an electrically controlled screw jack and the motors may be provided with a manually controlled emergency mechanism 11a, 12a.

In the example illustrated, the cam 15 is mounted on a transverse shaft 16 fixed to the frame 3, beside a triangular lever 17 one apex of which is articulated at 18 to a bar 19 which a jack device 20 connects to a bar 21 which is itself pivotably mounted on a fixed pivot 22 of the frame. The jack device 20 may be similar to the jack device 10.

It is controlled by a motor 24 with emergency manual control 24a. Motor 24 is connected by conductors 51 to a potentiometric box 52 connected by conduits 53, 54 to a Pitot tube 55.

Also pivotably mounted on the pivot 18 is a triangular lever 25 which bears at its central portion on a shaft 26 on which wheels 27 are mounted which roll on the recessed edge of the cam 15.

An elastic double-action restoring device 28 attached to the lever 17 at 29 and to the lever 25 at 30, tends to make the levers approach one another and to hold the wheels in contact with the edges of the cam. The force of this restoring device may be optionally determined. The length of the spring is so chosen that the force is slight when the wheels are situated opposite the point S of the cam.

The shaft 26 of the wheels 27 is connected by a link 31 to the frame, a curved recess such as 33 being provided in the lever 25 and the recessed side of the cam 15, so as to give said lever and cam the necessary freedom of movement.

The link 31 is pivotably mounted on an eccentric pivot 40 (FIGURES 2 and 3) of a strap 41 fast with a pivot 42 mounted in a bearing 43 carried by a fitting 44 which is fixed by bolts 45 to the frame 3.

The strap 41 is connected to the levers 17 by means of a link 46 connected on the one hand to a pivot pin 47 carried by the strap and, on the other hand, to a pivot pin 48 carried by a fitting 49 fixed to the lever 17 by screws 50 (FIGURE 1).

The fitting 44 has a hole 51 with which there corresponds a similar hole in an extension 52 of the strap 41 (FIGURE 1), which makes it possible to lock the strap on the fitting (dispensing with the link 46) to return to the apparatus described in the aforesaid U.S.A. patent application.

When the strap is not locked and the link is in place, the apparatus for creating artificial sensations operates as follows:

Let it be assumed that the apparatus is regulated to a given speed, the wheels 27 being situated at the apex S of the cam 15.

If the speed of the aircraft varies, the rod 19 displaces the articulation 18 for example in the direction of the arrows $f$ as explained in the aforesaid U.S.A. patent application. The link 46 transmits this displacement to the strap 41 which rotates about its pivot 42 in the direction of the arrow $g$, entraining in the same direction the eccentric pivot 40 and causing a displacement of the wheels 27 in the direction of the arrow $h$.

As a result, there is a reaction on the control surfaces in the direction of the arrow $i$, by means of the rod 13.

In the case assumed here, the variation in speed is an increase and the reaction on the control surfaces tends to bring to the top of the joystick 1 rearwards, which corresponds to the aircraft climbing to correct the variation in speed.

If the speed diminished, a reaction in the opposite sense would be obtained (lengthening of the distance 26-42) tending to make the aircraft dive and consequently to increase the speed of the said aircraft.

Thus, stability is ensured.

What I claim is:

1. An apparatus for the creation of artificial sensations intended to be associated with a control member of an aircraft comprising in combination:

a frame;

a control member mounted on said frame;

a first lever and a cam pivoted side by side on said frame;

a transmission linkage pivoted at one end to said control member and at the other end to said cam;

means operative for modification of the length of said linkage including a pivot on said first lever, a second lever pivoted on said pivot, a wheel interposed between said second lever and said cam, a spring device attached to said levers at points thereof remote from said pivot for urging said second lever towards said cam;

means connecting said pivot to a fixed point of said frame, said means being such that the distance between said pivot and fixed point depends on the speed of the machine;

and means the length of which depends too on the speed of the machine for connecting said wheel to a fixed point of said frame whereby the apparatus may react so as to improve the stability of the aircraft.

2. An apparatus as claimed in claim 1 wherein the means for connecting said wheel to a fixed point of said frame comprises:

a strap member pivoted on said frame about a stationary axis, a first connecting rod pivoted at one end to said wheel and at the other end to said strap member about an eccentric axis;

and a second connecting rod pivoted at one end to the said second lever and at the other end to said strap member about an axis different to that about which said first connecting rod is pivoted, whereby the distance between said stationary axis and said wheel may be modified in dependence from the speed of said machine for the purpose specified.

References Cited by the Examiner
UNITED STATES PATENTS

| | | | |
|---|---|---|---|
| 2,205,610 | 6/1940 | Van Nes | 244—83 |
| 3,109,312 | 11/1963 | Haupt | 74—470 X |
| 3,166,272 | 1/1965 | Liddell et al. | 74—469 X |

MILTON KAUFMAN, *Primary Examiner.*

FRED C. MATTERN, *Examiner*

D. H. THIEL, *Assistant Examiner.*